United States Patent [19]

Omure et al.

[11] Patent Number: 5,145,606

[45] Date of Patent: Sep. 8, 1992

[54] BLOWING COMPOSITIONS

[75] Inventors: Yukio Omure, Takatsuki; Keisuke Kitano, Osaka; Naoyoshi Hanatani, Settsu, all of Japan

[73] Assignee: Daikin Industries, Ltd., Osaka, Japan

[21] Appl. No.: 716,391

[22] Filed: Jun. 17, 1991

Related U.S. Application Data

[62] Division of Ser. No. 573,980, Aug. 28, 1990, abandoned.

[30] Foreign Application Priority Data

| Aug. 28, 1989 | [JP] | Japan | 1-220641 |
| Aug. 28, 1989 | [JP] | Japan | 1-220642 |
| Aug. 28, 1989 | [JP] | Japan | 1-220643 |
| Aug. 28, 1989 | [JP] | Japan | 1-220644 |
| Aug. 28, 1989 | [JP] | Japan | 1-220645 |
| Aug. 28, 1989 | [JP] | Japan | 1-220646 |
| Aug. 28, 1989 | [JP] | Japan | 1-220647 |
| Aug. 28, 1989 | [JP] | Japan | 1-220648 |
| Aug. 28, 1989 | [JP] | Japan | 1-220649 |
| Aug. 28, 1989 | [JP] | Japan | 1-220650 |
| Aug. 28, 1989 | [JP] | Japan | 1-220651 |

[51] Int. Cl.$^5$ .............................................. C08J 9/12
[52] U.S. Cl. ..................................... 252/350; 521/98; 521/131; 521/910
[58] Field of Search ..................... 521/79, 98, 131; 252/350

[56] References Cited

U.S. PATENT DOCUMENTS

| Re. 31,744 | 11/1984 | Watanabe et al. | 521/79 |
| 3,983,080 | 9/1976 | Suh et al. | 521/79 |
| 4,085,073 | 4/1978 | Suh et al. | 521/79 |
| 4,308,352 | 12/1981 | Knaus | 521/87 |
| 4,343,913 | 8/1982 | Watanabe et al. | 521/79 |
| 4,368,276 | 1/1983 | Park | 521/79 |
| 4,431,575 | 2/1984 | Fujie et al. | 521/79 |
| 4,492,788 | 1/1985 | Fujii et al. | 521/79 |

FOREIGN PATENT DOCUMENTS

| 30148 | 8/1989 | Australia . |
| 0152787 | 8/1985 | European Pat. Off. . |
| 0330988 | 9/1989 | European Pat. Off. . |
| 0385349 | 9/1990 | European Pat. Off. . |
| 0386663 | 9/1990 | European Pat. Off. . |
| 2330719 | 6/1977 | France . |
| WO88/08013 | 10/1988 | World Int. Prop. O. . |
| WO89/02455 | 3/1989 | World Int. Prop. O. . |

OTHER PUBLICATIONS

Journal of Thermal Insulation, vol. 12, pp. 172-182, published in Jan. 1989.

Database Japs/Japanese Patent Office & JP-A-1 038 034 (Abstract) published on Feb. 8, 1989, and Database Chemical Abstracts (Host: STN), vol. 111, No. 15, Abstract No. 133629v & JP-A-1 038 034 published on Feb. 8, 1989.

Database WPIL (Abstract), No. 89-156110; JP-A-1 098 638 published on Apr. 17, 1989.

Database WPIL (Abstract), No. 90-174272 & JP-A-2 113 037 published on Apr. 25, 1990.

Research Disclosure, vol. 146, 1976 (Abstract), No. 14623 published in Jun. 1976.

Database Chemical Abstract, vol. 113, No. 24 (Abstract) No. 213326z & JP-A-2 123 143 published on May 10, 1990.

Database WPIL, abstract No. 89-211477 & JP-A-1 149 739 published on Jun. 12, 1989.

*Primary Examiner*—Morton Foelak
*Attorney, Agent, or Firm*—Larson and Taylor

[57] ABSTRACT

The present invention provides blowing compositions for preparing foamed or expanded products of thermoplastics. Each of the blowing compositions comprises a combination of two of halogenated hydrocarbons.

2 Claims, No Drawings

BLOWING COMPOSITIONS

This is a division of application Ser. No. 07/573,980 filed Aug. 28, 1990, now abandoned.

This invention relates to blowing compositions for producing foamed articles of thermoplastics.

In the specification and the appended claims, the parts and percentages are all by weight unless otherwise specified.

Various blowing agents are known for producing thermoplastics foam. Representative examples are chlorofluorohydrocarbons such as dichlorodifluoromethane (R-12), dichlorotetrafluoroethane (R-114), etc. In recent years, it has been pointed out that some chlorofluorohydrocarbons, when released into the atmosphere, would deplete the stratospheric ozone layer, thereby inflicting a serious adverse influence on the ecosystem including humans on the earth. A worldwide agreement, "The Montreal Protocol," signed on September 1987, calls for a restriction of consumption and production of the major ozone-depleting chlorofluorohydrocarbons. Among the chlorofluorohydrocarbons to be controlled for restriction is R-12. In consequence, there is an urgent demand for novel blowing agents which have little or no influence on the ozone layer.

Use of LPG is proposed as a candidate for blowing agent replacing chlorofluorohydrocarbons. However, LPG has serious drawbacks that it cannot produce uniform cell structures in foamed products and it is inflammable under certain conditions.

We conducted extensive research to develop a novel blowing agent which can produce an expanded or foamed article of thermoplastics having improved properties and which, if released into the atmosphere, would exert little influence on the ozone layer. Our research revealed that some specific compositions exhibit excellent properties as a blowing agent for producing thermoplastics foam and the properties of these compositions are totally unexpected from the properties of a single component of the compositions.

The present invention provides the following blowing agents for producing thermoplastics foam.

(1) A blowing agent comprising tetrafluoroethane and chlorodifluoroethane (hereinafter referred to as Composition I).

(2) A blowing agent comprising tetrafluoroethane and 1,1-dichloro-1-fluoroethane (hereinafter referred to as Composition II).

(3) A blowing agent comprising tetrafluoroethane and dichlorotrifluoroethane (hereinafter referred to as Composition III).

(4) A blowing agent comprising tetrafluoroethane and chlorodifluoromethane (hereinafter referred to as Composition IV).

(5) A blowing agent comprising chlorotetrafluoroethane and dichlorotrifluoroethane (hereinafter referred to as Composition V).

(6) A blowing agent comprising chlorotetrafluoroethane and chlorodifluoroethane (hereinafter referred to as Composition VI).

(7) A blowing agent comprising chlorotetrafluoroethane and chlorodifluoromethane (hereinafter referred to as Composition VII).

(8) A blowing agent comprising 1,1,2,2,2-pentafluoroethane and dichlorotrifluoroethane (hereinafter referred to as Composition VIII).

(9) A blowing agent comprising 1,1,2,2,2-pentafluoroethane and 1,1-dichloro-1-fluoroethane (hereinafter referred to as Composition IX).

(10) A blowing agent comprising difluoroethane and chlorodifluoromethane (hereinafter referred to as Composition X).

(11) A blowing agent comprising trifluoroethane and chlorodifluoromethane (hereinafter referred to as Composition XI).

Compositions I to XI of the present invention will be described below in more detail.

I. Composition I

Tetrafluoroethane to be used in Composition I can be either of the isomers given below or a mixture of two.

(1) 1,2,2,2-Tetrafluoroethane (R-134a)

(2) 1,1,2,2-Tetrafluoroethane (R-134)

A better result is obtained when R-134a is used as the tetrafluoroethane component.

Chlorodifluoroethane to be used in Composition I can be any of the isomers given below or a mixture of at least two of them.

(1) 1-Chloro-1,1-difluoroethane (R-142b)

(2) 1-Chloro-2,2-difluoroethane (R-142)

(3) 1-Chloro-1,2-difluoroethane (R-142a)

The best result is achieved when R-142b is used as the chlorodifluoroethane component.

Composition I usually comprises about 80 to about 20% of tetrafluoroethane (hereinafter simply referred to as R-134a unless otherwise required) and about 20 to about 80% of chlorodifluoroethane (hereinafter simply referred to as R-142b unless otherwise required), based on the total weight of two components. When the ratio of R-134a is more than 80%, foamed products tend to be low or insufficient in expansion ratio. When the ratio of R-142b is more than 80%, foamed products of poor appearance tend to be produced with wrinkled surface.

Composition I preferably comprises about 70 to about 50% of R-134a and about 30 to about 50% of R-142b.

II. Composition II

Tetrafluoroethanes to be used in Composition II are the same as in Composition I.

Composition II usually comprises about 90 to about 50% of R-134a and about 10 to about 50% of 1,1-dichloro-1-fluoroethane (R-141b). When the ratio of R-134a is more than 90%, products of low expansion ratio will be formed. When the ratio of R-141b is more than 50%, the foamed articles tend to have poor appearance with coarse and wrinkled surface. Composition II preferably comprises about 85 to about 60% of R-134a and about 15 to about 40% of R-141b.

III. Composition III

Tetrafluoroethanes to be used in Composition III are the same as in Composition I.

Dichlorotrifluoroethane to be used in Composition III can be any of the isomers shown below or a mixture of them.

(1) 1,1-dichloro-2,2,2-trifluoroethane (R-123)

(2) 1,2-dichloro-1,2,2-trifluoroethane (R-123a)

(3) 1,1-dichloro-1,2,2-trifluoroethane (R-123b)

R-123 is preferable to obtain better results.

Composition III usually comprises about 90 to about 40% of R-134a and about 10 to about 60% of dichlorotrifluoroethane (hereinafter simply referred to as R-123 unless otherwise required). If the ratio of R-134a is more than 90%, the composition cannot achieve the desired effect as blowing agent, resulting in the formation of insufficient and poor expansion ratio. When the ratio of R-123 is more than 60%, the expanded products tend to have poor appearance will coarse, wrinkled surface. Composition III preferably comprises about 80 to about 50% of R-134a and about 20 to about 50% of R-123 to produce uniformly foamed products.

IV. Composition IV

Tetrafluoroethanes to be used in Composition IV are the same as in Composition I.

Composition IV usually comprises about 70 to about 20% of R-134a and about 30 to about 80% of chlorodifluoromethane (hereinafter simply referred to as R-22). When the ratio of R-134a exceeds 70%, the expansion ratio of the product formed will be low. When the ratio of R-22 is more than 80%, the foamed products obtained tend to have poor appearance.

Composition IV preferably comprises about 60 to 30% of R-134a and about 40 to about 70% of R-22 to produce a uniform cell distribution.

V. Composition V

Chlorotetrafluoroethanes to be used in Composition V can be either of the isomers given below or a mixture thereof.
(1) 1-Chlorotetrafluoroethane (R-124)
(2) 1-Chloro-1,1,2,2-tetrafluoroethane (R-124a)
R-124 is preferable to obtain a better result.

Dichlorotrifluoroethanes to be used in Composition V are the same as in Composition III.

Composition V usually comprises about 80 to 40% of chlorotetrafluoroethane (hereinafter simply refered to as R-124) and about 20 to about 60% of R-123. When the ratio of R-124 is more than 80%, products of low expansion ratio will be produced or poor expansion will result. If the ratio of R-123 exceeds 60%, foamed products will have coarse and wrinkled surface.

Composition V preferably comprises about 70 to about 50% of R-124 and about 30 to about 50% of R-123 to obtain a uniformly expanded articles.

VI. Composition VI

Chlorotetrafluoroethanes to be employed in Composition VI are the same as in Composition V.

Chlorodifluoroethanes to be used in Composition VI can be any of the isomers given below or a mixture of at least two of them.
(1) 1-Chloro-1,1-difluoroethane (R-142b)
(2) 1-Chloro-2,2-difluoroethane (R-142)
(3) 1-Chloro-1,2-difluoroethane (R-142a)
R-142b is preferred to achieve the best result.

Composition VI usually comprises about 80 to about 20% of R-124 and about 20 to about 80% of chlorodifluoromethane (hereinafter simply referred to as R-142b unless otherwise required). If the ratio of R-124 exceeds 80%, products with low or poor expansion ratio will be produced. When the ratio of R-142b is more than 80%, products of poor appearance with wrinkled surface will be formed.

Composition VI preferably comprises about 70 to about 30% of R-124 and about 30 to about 70% of R-142b to obtain a more uniform foamed articles.

VII. Composition VII

Chlorotetrafluoroethanes to be used in Composition VII are the same as those used in Composition V.

Composition VII usually comprises about 70 to about 20% of R-124 and about 30 to about 80% of chlorodifluoromethane (R-22). When the ratio of R-124 is more than 70%, expansion of the product will be insufficient. If the ratio of R-22 is more than 80%, products of lesser surface quality will be formed.

Composition VII usually comprises about 60 to about 30% of R-124 and about 40 to about 70% of R-22 to produce highly uniformly expanded products.

VIII. Composition VIII

Dichlorotrifluoroethanes to be employed in Composition VIII are the same as those used in Composition III.

Composition VIII usually comprises about 80 to about 20% of 1,1,2,2,2-pentafluoroethane (R-125) and about 20 to about 80% of R-123. Use of more than 80% of R-125 results in the formation of products of low expansion ratio or insufficient expansion. If the ratio of R-123 exceeds 80%, foamed products with coarse and wrinkled surface will be formed.

Composition VIII preferably comprises about 70 to about 40% of R-125 and about 30 to about 60% of R-123 in order to obtain uniformly expanded products.

IX. Composition IX

Composition IX usually comprises about 80 to about 40% of R-125 and about 20 to about 60% of 1,1-dichloro-1-fluoroethane (R-141b). When the more than 80% of R-125 is used, expansion ratio of the product is insufficient. If R-141b is used in an amount exceeding 60%, products of lesser surface appearance will be produced.

Composition IX preferably comprises about 70 to about 50% of R-125 and about 30 to about 50% of R-141b to obtain a uniformly expanded product.

X. Composition X

Difluoroethane to be used in Composition X is 1,1-difluoroethane (R-152a) or 1,2-difluoroethane (R-152) or a mixture thereof.

Composition X usually comprises about 80 to about 20% of difluoroethane (hereinafter simply referred to as R-152a) and about 20 to about 80% of chlorodifluoromethane (R-22). If the ratio of R-152a is more than 80%, expansion of thermoplastics will be insufficient. When R-22 is used in an excess amount, products will lower surface quality will be formed.

Composition X preferably comprises about 60 to about 20% of R-152a and about 40 to about 80% of R-22 in order to produce uniform articles.

XI. Composition XI

Trifluoroethanes to be employed in Composition XI is at least one of 1,1,1-trifluoroethane (R-143a) and 1,1,2-trifluoroethane (R-143).

Composition XI usually comprises about 80 to about 20% of trifluoroethane (hereinafter simply referred to as R-143a) and about 20 to about 80% of chlorodifluoromethane (R-22). When the ratio of R-143a is more than 80%, expansion ratio will be low and insufficient. If the amount of R-22 is more than 80%, products with lowered surface quality will result.

Compositions of the invention are relatively stable in use under mild conditions. Compositions I to XI can contain a conventional stabilizer for blowing agent which will improve chemical stability under severe conditions.

The blowing agents of the invention are used in the same manner as the conventional blowing agent.

Thermoplastics to which the blowing compositions of the invention are applied are those conventionally used for producing foamed or expanded products. Examples of these thermoplastic resin are: polystyrene, copolymers of styrene and a comonomer copolymerizable therewith such as styrene-butadiene copolymer styrene-acrylonitrile copolymer, styrene-methacrylate copolymer, etc., low density polyethylene (density=about 0.910 to about 0.925 g/cm$^3$), medium density polyethylene (density=about 0.926 to about 0.940 g/cm$^3$), high density polyethylene (density=about 0.941 to about 0.965 g/cm$^3$); isotactic polypropylene, polybutene-1, olefinic copolymer comprising ethylene and/or propylene and a comonomer copolymerizable therewith such as propylene-octene-1-ethylene copolymer, ethylene-propylene copolymer ethylene-vinyl acetate copolymer, ethylene-acrylic acid copolymer ethylene-ethylacrylate copolymer ethylene-vinyl chloride copolymer, etc.

The amount of the blowing agent of the invention to be used in the expansion process of thermoplastics is similar to the amount of the conventional blowing agent. The blowing agent of the invention is usually used in the range of about 0.001 to about 0.5 mole per 100 g of thermoplastics, although variable depending on the kind of thermoplastics, desired density of the foamed articles, etc.

Production of expanded products may be carried out in a conventional manner. Examples of processes of producing foamed products are as follows.

(1) After a starting plastic material is heated to obtain a melt and the melt is uniformly mixed with the blowing agent under elevated temperature and pressure, the mixture is extruded into a lower pressure zone to produce a foamed product.

(2) A plastic material is heated and a melt obtained is mixed with the blowing agent under elevated temperature and pressure to prepare a batch of mixture. Then the pressure applied to the batch is lowered to obtain a expanded article.

(3) After a starting plastic material is crosslinked with the application of electron beam, chemical crosslinking agent, etc., the blowing agent is admixed with the plastic material and the mixture is expanded with heating.

The blowing composition of the invention can be used in producing products and articles of any shape or form such as sheet, block, bar, tube, covering layer for electric cables and wires, molded products, etc.

The components used in the compositions of the invention are relatively easily decomposable before they reach the ozone layer in the stratosphere and hardly cause the destruction of ozone layer.

The blowing agents of the invention are safe to use since they are nonflammable or hardly inflammable.

The binary blowing compositions of the invention are more stable than when each component is used alone as blowing agent and capable of producing extremely uniform foamed articles.

Given below are examples and comparison examples to clarify the feature of the invention.

EXAMPLES 1 TO 5 AND COMPARISON EXAMPLES 1 TO 2

Foamed products of polyethylene were produced in the following procedures.

To a 100 g quantity of particulate polyethylene (0.92 g/cm$^2$ in density) was added 0.7 g of finely divided calcium carbonate to prepare a polymer material.

Blowing agents of the invention (Composition I) were prepared in mixing ratios as given in Table 1 below.

TABLE 1

| | Composition of blowing agent (%) | |
|---|---|---|
| | R-134a | R-142b |
| Example No. | | |
| 1 | 80 | 20 |
| 2 | 65 | 35 |
| 3 | 50 | 50 |
| 4 | 90 | 10 |
| 5 | 10 | 90 |
| Comparison Example No. | | |
| 1 | 100 | 0 |
| 2 | 0 | 100 |

The extruder used was mainly composed of a hopper, a weighing device, a mixer, compression and fusion vessel and an extruding screw (40 mm in inner diameter) and provided with an injection hole for blowing agent at the central portion of the vessel.

The polymer material was supplied from the hopper into the extruder and then to the polymer heated in the vessel was added the blowing agent through the injection hole and uniformly mixed. The amount of blowing agent used was 15 g per 100 g of polyethylene.

The mixture of polyethylene, calcium carbonate and blowing agent was heated to 130° C. while moving from the injection hole through the outlet of the extruder and extruded into an atmospheric zone to produce a foamed polyethylene product.

The properties of the foamed products obtained are given below in Table 2.

TABLE 2

| | Density (g/cm$^3$) | Stability room temperature | Appearance |
|---|---|---|---|
| Example No. | | | |
| 1 | 0.036 | 96 | Uniform |
| 2 | 0.036 | 94 | Uniform |
| 3 | 0.035 | 94 | Uniform |
| 4 | 0.045 | 92 | Lower expansion ratio |
| 5 | 0.033 | 90 | Slightly wrinkled |
| Comparison Example No. | | | |
| 1 | — | — | Poor expansion |
| 2 | 0.032 | 85 | Wrinkled |

The stability of foamed product is indicated in a ratio:

$$\frac{\text{volume after 24 hours} \times 100}{\text{volume immediately after extrusion}}$$

As seen from the results shown in Table 2, the blowing agents according to the invention (Composition I) are capable of producing uniform foamed articles of low shrinkage and high size stability.

In contrast, when R-134a or R-142b is used singly as blowing agent, products are low in expansion ratio or poor in appearance.

EXAMPLES 6 TO 9 AND COMPARISON EXAMPLES 3 TO 4

Foamed products of polyethylene were prepared following the general procedures of Example 1 and using the blowing agents shown in Table 3.

TABLE 3

| | Composition of blowing agent (%) | |
|---|---|---|
| | R-134a | R-141b |
| Example No. | | |
| 6 | 80 | 20 |
| 7 | 70 | 30 |
| 8 | 60 | 40 |
| 9 | 10 | 90 |
| Comparison Example No. | | |
| 3 | 100 | 0 |
| 4 | 0 | 100 |

The properties of the foamed articles obtained are shown in Table 4.

TABLE 4

| | Density (g/cm³) | Stability room temperature | Appearance |
|---|---|---|---|
| Example No. | | | |
| 6 | 0.036 | 96 | Uniform |
| 7 | 0.036 | 94 | Uniform |
| 8 | 0.035 | 94 | Almost uniform |
| 9 | 0.031 | 75 | Partly coarse |
| Comparison Example No. | | | |
| 3 | — | — | Poor expansion |
| 4 | 0.029 | 57 | Coarse |

Table 4 reveals that the blowing agents according to the invention (Composition II) can form uniformly formed articles of improved size stability.

EXAMPLES 10 TO 13 AND COMPARISON EXAMPLES 5 TO 6

Foamed products of polyethylene were produced following the general procedures of Example 1 except that the blowing agents shown in Table 5 were used.

TABLE 5

| | Composition of blowing agent (%) | |
|---|---|---|
| | R-134a | R-123 |
| Example No. | | |
| 10 | 80 | 20 |
| 11 | 65 | 35 |
| 12 | 50 | 50 |
| 13 | 20 | 80 |
| Comparison Example No. | | |
| 5 | 100 | 0 |
| 6 | 0 | 100 |

The properties of the expanded products are given in Table 6 below.

TABLE 6

| | Density (g/cc) | Stability room temperature | Appearance |
|---|---|---|---|
| Example No. | | | |
| 10 | 0.036 | 95 | Uniform |
| 11 | 0.036 | 94 | Uniform |
| 12 | 0.035 | 94 | Uniform |
| 13 | 0.031 | 72 | Partly coarse |
| Comparison Example No. | | | |
| 5 | — | — | Poor expansion |
| 6 | 0.029 | 55 | Coarse |

It is apparent from the results shown in Table 6 that the blowing composition of the invention (Composition III) have excellent properties for producing foamed products of polyethylene.

EXAMPLES 14 TO 18 AND COMPARISON EXAMPLES 7 TO 8

Foamed articles of polyethylene were obtained in a similar manner as in Example 1 except that the blowing agents shown in Table 7 were used.

TABLE 7

| | Composition of blowing agent (%) | |
|---|---|---|
| | R-134a | R-22 |
| Example No. | | |
| 14 | 90 | 10 |
| 15 | 60 | 40 |
| 16 | 50 | 50 |
| 17 | 30 | 70 |
| 18 | 10 | 90 |
| Comparison Example No. | | |
| 7 | 100 | 0 |
| 8 | 0 | 100 |

The properties of the foamed products are shown in Table 8.

TABLE 8

| | Density (g/cc) | Stability room temperature | Appearance |
|---|---|---|---|
| Example No. | | | |
| 14 | 0.041 | 90 | Lower expansion ratio |
| 15 | 0.036 | 95 | Uniform |
| 16 | 0.036 | 94 | Uniform |
| 17 | 0.035 | 94 | Uniform |
| 18 | 0.039 | 89 | Slightly wrinkled |
| Comparison Example No. | | | |
| 7 | — | — | Poor expansion |
| 8 | 0.038 | 85 | Highly wrinkled |

The results of Table 8 indicates the blowing agents according to the invention (Composition IV) can produce foamed products polyethylene of improved properties.

EXAMPLES 19 TO 23 AND COMPARISON EXAMPLES 9 TO 10

Foamed articles of polyethylene were produced following the general procedures of Example 1 and using the blowing compositions given in Table 9 below.

TABLE 9

| | Composition of blowing agent (%) | |
|---|---|---|
| | R-124 | R-123 |
| Example No. | | |
| 13 | 80 | 20 |
| 14 | 65 | 35 |
| 15 | 50 | 50 |
| 16 | 90 | 10 |
| 17 | 10 | 90 |
| Comparison Example No. | | |

TABLE 9-continued

| | Composition of blowing agent (%) | |
|---|---|---|
| | R-124 | R-123 |
| 9 | 100 | 0 |
| 10 | 0 | 100 |

The properties of the products obtained are given in Table 10.

TABLE 10

| | Density (g/cc) | Stability room temperature | Appearance |
|---|---|---|---|
| Example No. | | | |
| 19 | 0.036 | 95 | Uniform |
| 20 | 0.036 | 94 | Uniform |
| 21 | 0.035 | 93 | Almost uniform |
| 22 | 0.039 | 86 | Lower expansion ratio |
| 23 | 0.030 | 60 | Partly coarse |
| Comparison Example No. | | | |
| 9 | 0.040 | 90 | Poor expansion |
| 10 | 0.029 | 55 | Coarse |

As seen from the results shown in Table 10, the compositions of the invention (Composition V) are good blowing agents for preparing foamed products of polyethylene.

EXAMPLES 24 TO 28 AND COMPARISON EXAMPLES 11 TO 12

The general procedures of Example 1 were repeated except that the blowing agents shown in Table 11 were used.

TABLE 11

| | Composition of blowing agent (%) | |
|---|---|---|
| | R-124 | R-142b |
| Example No. | | |
| 24 | 70 | 30 |
| 25 | 50 | 50 |
| 26 | 30 | 70 |
| 27 | 90 | 10 |
| 28 | 10 | 90 |
| Comparison Example No. | | |
| 11 | 100 | 0 |
| 12 | 0 | 100 |

Properties of the products obtained are given in Table 12 below.

TABLE 12

| | Density (g/cc) | Stability room temperature | Appearance |
|---|---|---|---|
| Example No. | | | |
| 24 | 0.036 | 95 | Uniform |
| 25 | 0.036 | 94 | Uniform |
| 26 | 0.035 | 93 | Uniform |
| 27 | 0.038 | 92 | Lower expansion ratio |
| 28 | 0.033 | 90 | Slightly wrinkled |
| Comparison Example No. | | | |
| 11 | — | — | Poor expansion |
| 12 | 0.032 | 85 | Wrinkled |

Table 12 reveals that the blowing agents of the invention (Composition VI) can produce foamed articles of polyethylene with highly improved properties.

EXAMPLES 29 TO 33 AND COMPARISON EXAMPLES 13 TO 14

Foamed products of polyethylene were produced repeating the procedures of Example 1 and using the blowing agents shown in Table 13.

TABLE 13

| | Composition of blowing agent (%) | |
|---|---|---|
| | R-124 | R-22 |
| Example No. | | |
| 29 | 10 | 90 |
| 30 | 20 | 80 |
| 31 | 40 | 60 |
| 32 | 60 | 40 |
| 33 | 80 | 20 |
| Comparison Example No. | | |
| 13 | 100 | 0 |
| 14 | 0 | 100 |

The properties of the foamed products obtained are shown in Table 14 below.

TABLE 14

| | Density (g/cc) | Stability room temperature | Appearance |
|---|---|---|---|
| Example No. | | | |
| 29 | 0.040 | 87 | Slightly wrinkled |
| 30 | 0.035 | 95 | Uniform |
| 31 | 0.037 | 94 | Uniform |
| 32 | 0.038 | 95 | Uniform |
| 33 | 0.038 | 89 | Lower expansion ratio |
| Comparison Example No. | | | |
| 13 | — | — | Highly wrinkled |
| 14 | 0.038 | 85 | Poor expansion |

The results of Table 14 show that the foamed products obtained with use of the blowing agents of the invention (Composition VII) have improved properties.

EXAMPLES 34 TO 38 AND COMPARISON EXAMPLES 15 TO 16

Foamed products of polyethylene were prepared following the general procedures of Example 1 except that the blowing agents shown in Table 15 were used.

TABLE 15

| | Composition of blowing agent (%) | |
|---|---|---|
| | R-125 | R-123 |
| Example No. | | |
| 34 | 90 | 10 |
| 35 | 70 | 30 |
| 36 | 50 | 50 |
| 37 | 30 | 70 |
| 38 | 90 | 10 |
| Comparison Example No. | | |
| 15 | 100 | 0 |
| 16 | 0 | 100 |

The properties of the products are given in Table 16.

TABLE 16

| | Density (g/cc) | Stability room temperature | Appearance |
|---|---|---|---|
| Example No. | | | |
| 34 | 0.040 | 90 | Lower expansion ratio |

TABLE 16-continued

| | Density (g/cc) | Stability room temperature | Appearance |
|---|---|---|---|
| 35 | 0.036 | 95 | Uniform |
| 36 | 0.036 | 92 | Uniform |
| 37 | 0.035 | 91 | Relatively uniform |
| 38 | 0.030 | 72 | Slightly coarse |
| Comparison Example No. | | | |
| 15 | — | — | Poor expansion |
| 16 | 0.029 | 55 | Coarse |

Table 16 indicates that the blowing agents of the invention (Composition VIII) can produce foamed articles of improved qualities.

EXAMPLES 39 TO 43 AND COMPARISON EXAMPLES 17 TO 18

Expanded products of polyethylene were produced in a similar manner as in Example 1 except that the blowing compositions given in Table 17 were used.

TABLE 17

| | Composition of blowing agent (%) | |
|---|---|---|
| | R-125 | R-141b |
| Example No. | | |
| 39 | 90 | 10 |
| 40 | 80 | 20 |
| 41 | 60 | 40 |
| 42 | 50 | 50 |
| 43 | 10 | 90 |
| Comparison Example No. | | |
| 17 | 100 | 0 |
| 18 | 0 | 100 |

The properties of the products are as shown in Table 16 below.

TABLE 16

| | Density (g/cc) | Stability room temperature | Appearance |
|---|---|---|---|
| Example No. | | | |
| 39 | 0.041 | 91 | Lower expansion ratio |
| 40 | 0.036 | 95 | Uniform |
| 41 | 0.036 | 94 | Uniform |
| 42 | 0.035 | 94 | Relatively uniform |
| 43 | 0.031 | 73 | Partly coarse |
| Comparison Example No. | | | |
| 17 | — | — | Poor expansion |
| 18 | 0.029 | 57 | Coarse |

The results of Table 16 reveals that the blowing agents according to the invention (Composition IX) can produce foamed polyethylene products of improved properties.

EXAMPLES 44 TO 46 AND COMPARISON EXAMPLES 19 TO 22

Foamed polyethylene products were prepared following the general procedures of Example 1 except that the blowing agents used were as shown in Table 19.

TABLE 19

| | Composition of blowing agent (%) | |
|---|---|---|
| | R-152a | R-22 |
| Example No. | | |
| 44 | 20 | 80 |
| 45 | 40 | 60 |
| 46 | 60 | 40 |
| Comparison Example No. | | |
| 19 | 0 | 100 |
| 20 | 10 | 90 |
| 21 | 90 | 10 |
| 22 | 100 | 0 |

The properties of the products are given in Table 20.

TABLE 20

| | Density (g/cc) | Stability room temperature | Appearance |
|---|---|---|---|
| Example No. | | | |
| 1 | 0.036 | 95 | Uniform |
| 2 | 0.036 | 94 | Uniform |
| 3 | 0.035 | 94 | Uniform |
| Comparison Example No. | | | |
| 1 | 0.038 | 85 | Highly wrinkled |
| 2 | 0.039 | 88 | Wrinkled |
| 3 | 0.036 | 87 | Very low expansion ratio |
| 4 | 0.037 | 75 | Very low expansion ratio |

Table 20 reveals that the blowing agents of the invention (Composition X) can produce uniform articles of excellent size stability.

EXAMPLES 47 TO 51 AND COMPARISON EXAMPLES 21 TO 22

Foamed articles of polyethylene were produced repeating the general procedures of Example 1 and using the blowing composition shown in Table 21.

TABLE 21

| | Composition of blowing agent (%) | |
|---|---|---|
| | R-143a | R-22 |
| Example No. | | |
| 47 | 10 | 90 |
| 48 | 30 | 70 |
| 49 | 50 | 50 |
| 50 | 70 | 30 |
| 51 | 90 | 10 |
| Comparison Example No. | | |
| 21 | 0 | 100 |
| 22 | 100 | 0 |

The properties of the products obtained are shown in Table 22.

TABLE 22

| | Density (g/cc) | Stability room temperature | Appearance |
|---|---|---|---|
| Example No. | | | |
| 47 | 0.039 | 92 | Partly wrinkled |
| 48 | 0.035 | 95 | Uniform |
| 49 | 0.036 | 95 | Uniform |
| 50 | 0.037 | 96 | Uniform |
| 51 | 0.042 | 90 | Lower expansion ratio |
| Comparison Example No. | | | |

TABLE 22-continued

| | Density (g/cc) | Stability room temperature | Appearance |
|---|---|---|---|
| 21 | 0.038 | 85 | Highly wrinkled |
| 22 | — | — | Poor expansion |

The results in Table 22 indicates that the products obtained with use of the blowing agents the invention (Composition XI) have improved properties as foam.

We claim:

1. A blowing composition for producing foam of thermoplastics which comprises about 80 to about 20% of difluoroethane and about 20 to about 80% of chlorodifluoromethane.

2. A blowing composition according to claim 1 which comprises about 60 to about 20% of difluoroethane and about 40 to about 80% of chlorodifluoromethane.

* * * * *